United States Patent
Nakanishi et al.

(10) Patent No.: US 11,077,552 B2
(45) Date of Patent: Aug. 3, 2021

(54) CONTROL SYSTEM, MACHINE LEARNING APPARATUS, MAINTENANCE ASSISTANCE APPARATUS, DATA GENERATING METHOD, AND MAINTENANCE ASSISTING METHOD

(71) Applicant: KABUSHIKI KAISHA YASKAWA DENKI, Kitakyushu (JP)

(72) Inventors: Mitsuaki Nakanishi, Kitakyushu (JP); Tsuyoshi Wakamatsu, Kitakyushu (JP); Yutaro Uchida, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 287 days.

(21) Appl. No.: 16/200,850

(22) Filed: Nov. 27, 2018

(65) Prior Publication Data

US 2019/0160665 A1    May 30, 2019

(30) Foreign Application Priority Data

Nov. 28, 2017    (JP) .............................. JP2017-227872

(51) Int. Cl.
  *G05B 19/04*    (2006.01)
  *B25J 9/16*    (2006.01)
  *G05B 23/02*    (2006.01)

(52) U.S. Cl.
  CPC .............. *B25J 9/163* (2013.01); *B25J 9/1605* (2013.01); *B25J 9/1674* (2013.01);
  (Continued)

(58) Field of Classification Search
  CPC ........ B25J 9/163; B25J 9/1605; B25J 9/1674; B25J 9/1664; B25J 19/06; B25J 9/1697;
  (Continued)

(56) References Cited

U.S. PATENT DOCUMENTS

2013/0151214 A1    6/2013    Ryou
2013/0250281 A1*    9/2013    Shirata ............... G01N 21/8507
                                                         356/70
(Continued)

FOREIGN PATENT DOCUMENTS

JP    2009-226488 A    10/2009
JP    2013-144349 A    7/2013
WO    WO 2016/194029 A1    12/2016

OTHER PUBLICATIONS

Extended European Search Report dated Apr. 24, 2019 in Patent Application No. 18208506.8, 8 pages.
(Continued)

*Primary Examiner* — B M M Hannan
(74) *Attorney, Agent, or Firm* — Oblon, McClelland, Maier & Neustadt, L.L.P.

(57) ABSTRACT

A control system for an actuator includes a non-transitory computer readable medium storing a database in which first information, second information and third information are stored and correlated with each other, and processing circuitry that performs machine learning based on the first information, the second information and the third information stored in the database. The first information is associated with a rotational speed of a reducer in the actuator, the second information is associated with a torque acting on the reducer, the third information indicates a concentration of iron powder in grease in the reducer, and the machine learning builds a concentration estimation model indicating a relationship between the first information, the second information and the third information.

20 Claims, 8 Drawing Sheets

(52) U.S. Cl.
CPC ..... *G05B 23/0254* (2013.01); *G05B 23/0283* (2013.01); *G05B 2219/33034* (2013.01); *G05B 2219/42155* (2013.01)

(58) Field of Classification Search
CPC ...... B25J 9/1676; B25J 13/089; B25J 19/023; B25J 19/022; B25J 3/04; B25J 9/00; B25J 9/0081; B25J 9/16; B25J 13/00; B25J 19/04; G05B 23/0283; G05B 23/0254; G05B 2219/42155; G05B 2219/33034; G05B 2219/33056; G05B 2219/40202; G05B 19/42; G05B 2219/37572; G05B 2219/39082; G05B 2219/37563; G05B 2219/39; G05B 2219/3755; G05B 2219/39083; G05B 2219/37565; Y10S 901/03; Y10S 901/00; F16P 3/14; F16P 3/142; A47L 2201/00; A61B 34/00; G05D 1/00; G05D 2201/02; G05D 1/0274; G05D 1/0255; G05D 1/0246; G06N 3/008; B62D 57/032

USPC .......................... 700/245, 246, 250, 253, 257
See application file for complete search history.

(56) References Cited

U.S. PATENT DOCUMENTS

| | | | |
|---|---|---|---|
| 2013/0250303 A1* | 9/2013 | Shirata | F16H 57/0405 356/436 |
| 2014/0009667 A1 | 1/2014 | Nakazumi et al. | |
| 2015/0077028 A1 | 3/2015 | Seki et al. | |
| 2017/0002680 A1* | 1/2017 | Tonaka | F01D 5/12 |
| 2017/0082188 A1* | 3/2017 | McKimpson | F16H 57/0405 |
| 2018/0147735 A1* | 5/2018 | Kuno | B25J 9/1674 |
| 2018/0276563 A1* | 9/2018 | Bryant | E21B 41/0092 |

OTHER PUBLICATIONS

European Office Acton dated Dec. 10, 2020 in European Patent Application No. 18208506.8, 5 pages.

* cited by examiner

CONTROL SYSTEM, MACHINE LEARNING APPARATUS, MAINTENANCE ASSISTANCE APPARATUS, DATA GENERATING METHOD, AND MAINTENANCE ASSISTING METHOD

CROSS-REFERENCE TO RELATED APPLICATIONS

The present application claims priority under 35 U.S.C. § 119 to Japanese Patent Application No. 2017-227872, filed Nov. 28, 2017. The contents of this application are incorporated herein by reference in their entirety.

BACKGROUND

Field of the Invention

The embodiments disclosed herein relate to a control system, a machine learning apparatus, a maintenance assistance apparatus, a data generating method, and a maintenance assisting method.

Discussion of the Background

JP 2013-144349A discloses a method for deriving a lifetime of a reducer based on the reducer's rated lifetime, rated speed, and rated torque, and based on the reducer's average torque and average rotational speed.

SUMMARY

According to one aspect of the present invention, a control system for an actuator includes a non-transitory computer readable medium storing a database in which first information, second information and third information are stored and correlated with each other, and processing circuitry that performs machine learning based on the first information, the second information and the third information stored in the database. The first information is associated with a rotational speed of a reducer in the actuator, the second information is associated with a torque acting on the reducer, the third information indicates a concentration of iron powder in grease in the reducer, and the machine learning builds a concentration estimation model indicating a relationship between the first information, the second information and the third information.

According to another aspect of the present invention, a machine learning apparatus includes a non-transitory computer readable medium storing a database in which first information, second information and third information are stored and correlated with each other, and machine learning processing circuitry that performs machine learning based on the first information, the second information and the third information stored in the database. The first information is associated with a rotational speed of a reducer in an actuator, the second information is associated with a torque acting on the reducer, the third information indicates a concentration of iron powder in grease in the reducer, and the machine learning builds a concentration estimation model indicating a relationship between the first information, the second information and the third information.

According to yet another aspect of the present invention, a maintenance assistance apparatus includes maintenance assistance processing circuitry that inputs first information and second information into a concentration estimation model to derive an estimation value of third information, builds an increasing estimation model of the third information based on a time transition of the estimation value of the third information, and derives a first recommended point of time for maintenance of a reducer based on the increasing estimation model. The first information is associated with a rotational speed of the reducer in an actuator, the second information is associated with a torque acting on the reducer, the third information indicates a concentration of iron powder in grease in the reducer, and the concentration estimation model indicates a relationship between the first information, the second information and the third information.

According to yet another aspect of the present invention, a method includes obtaining learning data of first information, second information and third information that are correlated with each other, and performing machine learning based on the learning data. The first information is associated with a rotational speed of a reducer in an actuator, the second information is associated with a torque acting on the reducer, the third information indicates a concentration of iron powder in grease in the reducer, and the machine learning builds a concentration estimation model indicating a relationship between the first information, the second information and the third information.

According to still another aspect of the present invention, a maintenance assisting method for a reducer includes inputting first information and second information into a concentration estimation model to derive an estimation value of third information. The first information is associated with a rotational speed of the reducer included in an actuator. The second information is associated with a torque acting on the reducer. The third information indicates a concentration of iron powder in grease in the reducer. The concentration estimation model indicates a relationship between the first information, the second information, and the third information. An increasing estimation model of the third information is built based on a time transition of the estimation value of the third information. A first recommended point of time for maintenance of the reducer is derived based on the increasing estimation model.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
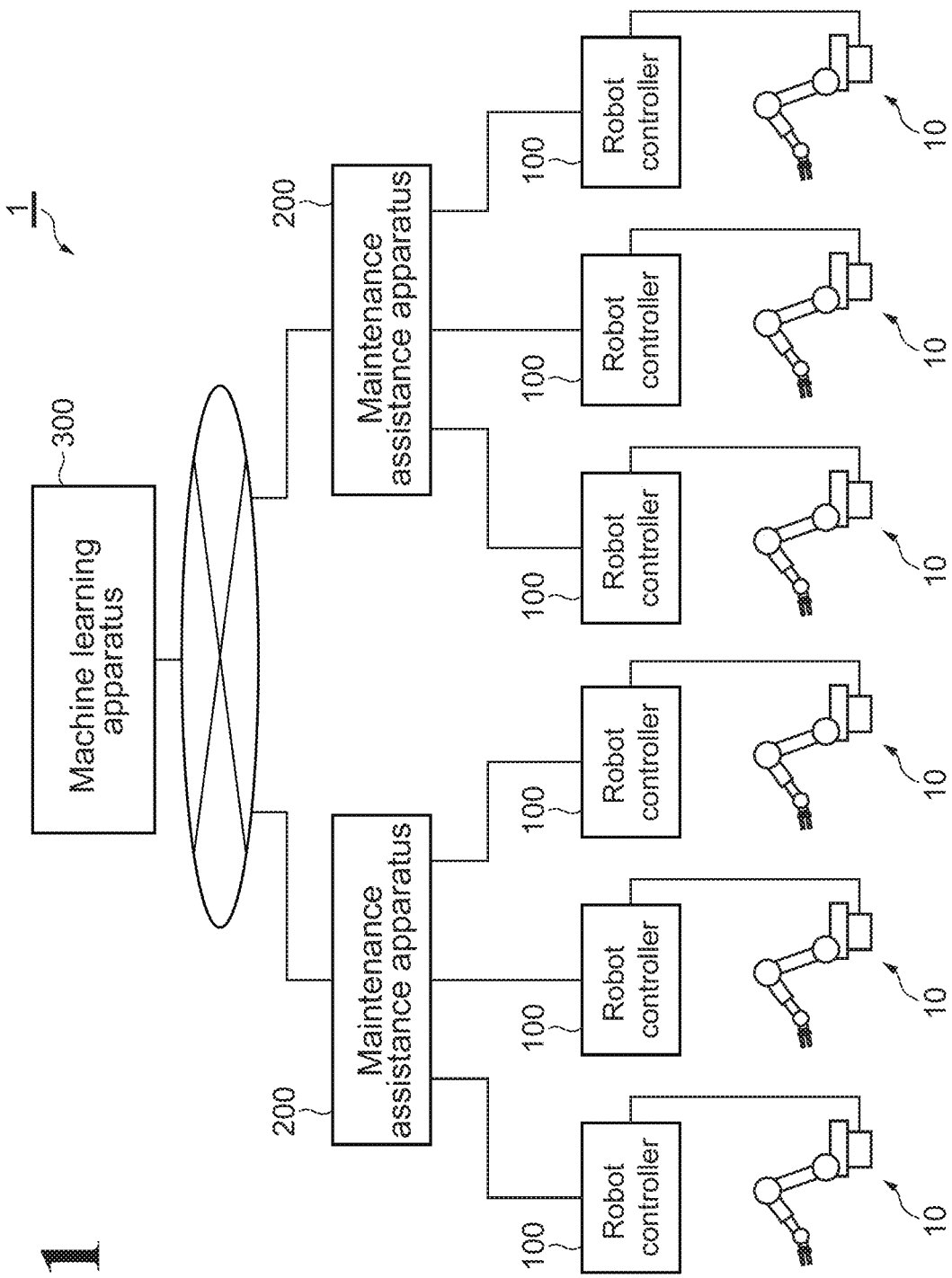
FIG. 1 is a schematic illustrating a configuration of a control system as a whole.

The embodiments will now be described with reference to the accompanying drawings, wherein like reference numerals designate corresponding or identical elements throughout the various drawings.

Control System

A control system 1 according to this embodiment is a control system for an actuator. Specifically, the control system 1 manages maintenance time of a reducer of the actuator. As illustrated in FIG. 1, the control system 1 is used at a site where multi-axis robots 10 are used for work such as machining workpieces (not illustrated) and assembling workpieces. The control system 1 includes a robot controller 100, maintenance assistance apparatuses 200, and a machine learning apparatus 300. The robot controller 100 controls the multi-axis robots 10. Each of the maintenance assistance apparatuses 200 is connected to the robot controller 100. The machine learning apparatus 300 is used for learning purposes.

Figure 2:
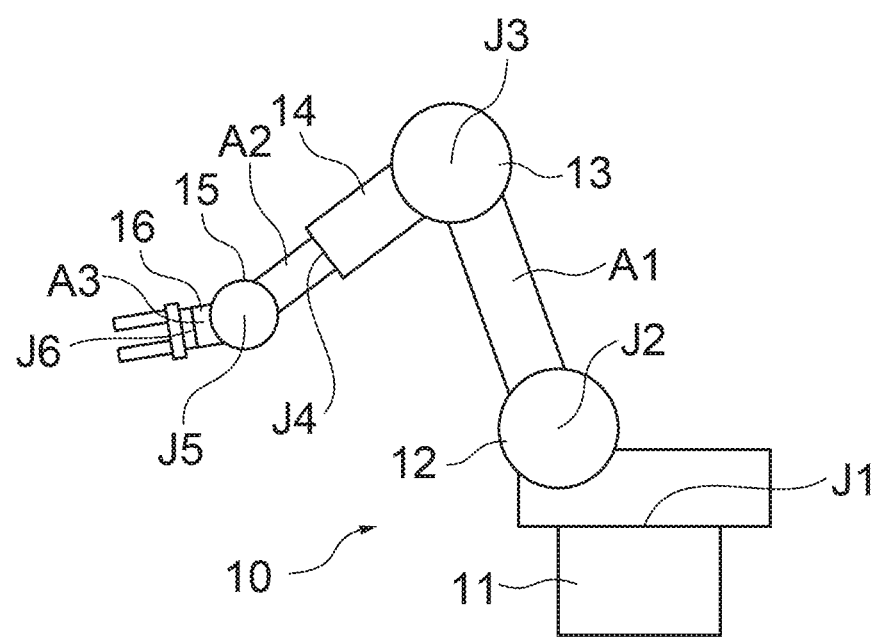
FIG. 2 is a schematic illustrating a configuration of a robot equipped with an actuator.

The multi-axis robots 10 perform work such as machining workpieces and assembling workpieces. As illustrated in FIG. 2, each multi-axis robot 10 is a serial-link multi-articular robot, and includes: a plurality of (for example, six-axis) joint axes J1 to J6; a plurality of (for example, three) arms A1 to A3; and a plurality of actuators 11 to 16. The actuators 11 to 16 respectively drive the joint axes J1 to J6 to cause the arms A1 to A3 to make swing motion.

Figure 3:
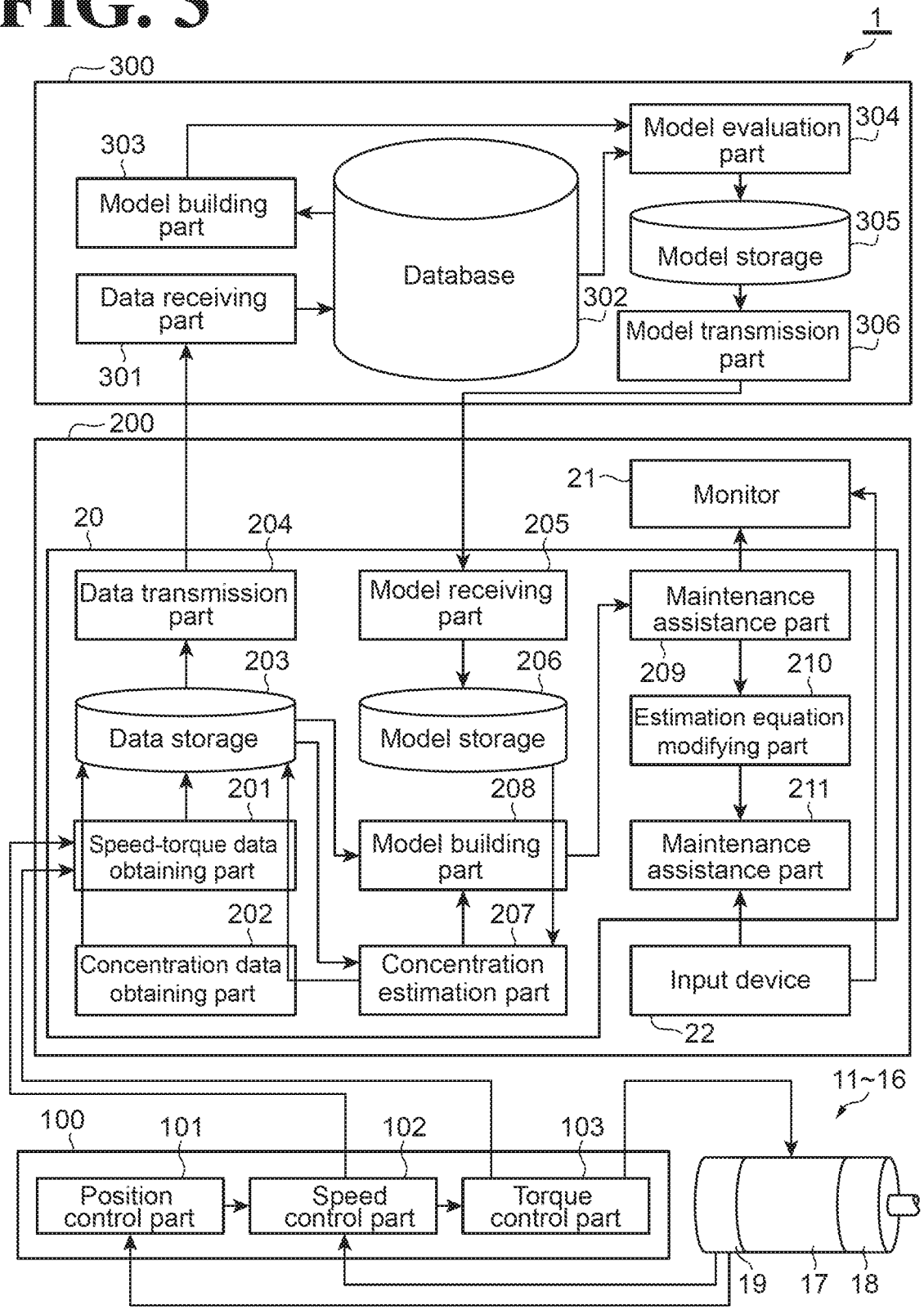
FIG. 3 is a block diagram illustrating a functional configuration of the control system.

Each of the actuators 11 to 16 includes a motor 17, a reducer 18, and a sensor 19 (see FIG. 3). In this embodiment, the motor 17 is an electric motor and serves as a motive power source of the corresponding one of the actuators 11 to 16. The reducer 18 transmits the rotational torque of the motor 17 to the corresponding one of the joint axes J1 to J6 at a rotational speed lower than the rotational speed of the motor 17. The sensor 19 detects information concerning the position (rotational angle) and the rotational speed of the motor 17. Specifically, the information is concerning the rotational angle and the rotational speed of the input shaft side of the reducer 18. In this embodiment, the sensor 19 is an encoder and outputs a pulse signal having a frequency proportional to the rotational speed of the motor 17. It is to be noted that the sensor 19 may detect information concerning the rotational angle and the rotational speed of the output shaft side of the reducer 18.

Robot Controller

The robot controller 100 controls the motor 17 of each of the actuators 11 to 16 of the multi-axis robots 10. The robot controller 100 includes functional configurations (hereinafter referred to as "functional modules"), namely, a position control part 101, a speed control part 102, and a torque control part 103.

The position control part 101 generates a speed command value based on: a target position (target rotational angle) set by, for example, an upper-level controller (for example, programmable logic controller); and an actually measured position (actually measured rotational angle) of the motor 17 fed back from the sensor 19. The speed command value is such a value that the actually measured position becomes as close as possible to the target position. The actually measured position can be obtained by counting a pulse signal output from the sensor 19. For example, the position control part 101 generates the speed command value by subjecting the error between the target position and the actually measured position (hereinafter referred to as "position error") to an operation such as proportional operation, proportional-integral operation, and proportional-integral-derivative operation.

The speed control part 102 generates a torque command value based on: the speed command value generated by the position control part 101; and an actually measured rotational speed of the motor 17 fed back from the sensor 19. The torque command value is such a value that the actually measured rotational speed becomes as close as possible to the speed command value. The actually measured rotational speed can be obtained by detecting the frequency of the pulse signal output from the sensor 19. For example, the speed control part 102 generates the torque command value by subjecting the error between the speed command value and the actually measured rotational speed (hereinafter referred to as "speed error") to an operation such as proportional operation, proportional-integral operation, and proportional-integral-derivative operation.

The torque control part 103 outputs a drive current to the motor 17 to cause the motor 17 to generate a torque that is based on the torque command value generated by the speed control part 102.

If there is a backlash in the reducer 18 of each of the actuators 11 to 16, the backlash causes the reducer 18 and the arms A1 to A3 of the multi-axis robot 10 to wobble. The wobbling causes an inertia force resulting in a disturbance that causes the above-described position error and speed error to vary. In order to cancel the variation, it is necessary to change the speed command value and the torque command value. That is, the speed command value and the torque command value each includes a variation component caused by a backlash.

Maintenance Assistance Apparatus

The maintenance assistance apparatus 200 uses speed data (first information), torque data (second information), and concentration data (third information). The speed data is associated with the rotational speed of the reducer 18 of each of the actuators 11 to 16. The torque data is associated with the torque acting on the reducer 18. The concentration data indicates the iron powder concentration in the grease in the reducer 18. The maintenance assistance apparatus 200 executes: inputting the speed data and the torque data into a concentration estimation model, which indicates a relationship between the speed data, the torque data, and the concentration data, to derive an estimation value of the concentration data; building an increasing estimation model of the concentration data based on a time transition of the estimation value of the concentration data; and deriving a first recommended point of time for maintenance of the reducer 18 based on the increasing estimation model.

The maintenance assistance apparatus 200 may further execute: modifying an estimation equation for deriving a second recommended point of time for the maintenance of the reducer so as to make the second recommended point of time as close as possible to the first recommended point of time, which is derived by a first maintenance assistance part, the estimation equation indicating a relationship between the second recommended point of time, the rotational speed of the reducer, and the torque acting on the reducer (for example, the estimation equation indicates the second recommended point of time in relation to the rotational speed of the reducer and the torque acting on the reducer); and deriving the recommended point of time for maintenance of the reducer based on the rotational speed of the reducer, the torque acting on the reducer, and the modified estimation equation, which is modified by an estimation equation modification part.

The maintenance assistance apparatus 200 may further execute receiving a data of the concentration estimation model from the machine learning apparatus 300. The maintenance assistance apparatus 200 may further execute transmitting the speed data, the torque data, the estimation value of the concentration data (which is derived by inputting the speed data and the torque data into the concentration estimation model) to the machine learning apparatus 300 such that the speed data, the torque data, the estimation value of the concentration data are correlated with each other.

The maintenance assistance apparatus 200 includes a body 20, a monitor 21, and an input device 22. The monitor 21 includes a liquid crystal monitor or another kind of monitor and is used to show information to a user. The input device 22 is a key pad or a similar device and obtains information input by a user. The monitor 21 and the input device 22 may be integral to each other in a form known as touch panel. Alternatively, all the body 20, the monitor 21, and the input device 22 may be integral to each other.

The body 20 includes functional configurations (hereinafter referred to as "functional modules"), namely, a speed-torque data obtaining part 201, a concentration data obtaining part 202, a data storage 203, a data transmission part 204, a model receiving part 205, a model storage 206, a concentration estimation part 207, a model building part 208 (second model building part), a maintenance assistance part 209 (first maintenance assistance part), an estimation equation modification part 210, and a maintenance assistance part 211 (second maintenance assistance part).

The speed-torque data obtaining part 201 obtains the speed data and the torque data, and stores them in the data storage 203. For example, the speed-torque data obtaining part 201 obtains, as the speed data, the actually measured rotational speed of the motor 17 from the speed control part 102 of the robot controller 100, and obtains, as the torque data, the torque command value input into the torque control part 103 of the robot controller 100. The speed-torque data obtaining part 201 stores the speed data and the torque data in the data storage 203 such that the speed data is correlated with the point of time at which the speed data was obtained and that the torque data is correlated with the point of time at which the torque data was obtained. It is to be noted that the speed-torque data obtaining part 201 may obtain, as the speed data, the speed command value input into the speed control part 102, and may obtain, as the torque data, the drive current of the motor 17 from the torque control part 103.

The concentration data obtaining part 202 obtains concentration data associated with the iron powder concentration in the grease in the reducer 18. The concentration data includes: an actually measured value of the iron powder concentration measured in the grease filling the reducer 18 after a predetermined period of time has passed since the filling (this actually measured value will be hereinafter referred to as "actually measured iron powder concentration"); and an estimation value of the iron powder concentration derived based on the speed data and the torque data (this iron powder concentration will be hereinafter referred to as "estimated iron powder concentration"). The actually measured iron powder concentration can be measured by, for example, sampling the grease from the reducer 18. The actually measured iron powder concentration is measured by a worker at predetermined time of day, and is input into the concentration data obtaining part 202. The deriving of the estimated iron powder concentration will be described later. The concentration data obtaining part 202 stores the concentration data in the data storage 203 such that the concentration data is correlated with the point of time at which the concentration data was obtained. It is to be noted that the point of time at which the concentration data was obtained includes the point of time at which the actually measured iron powder concentration was obtained and the point of time at which the estimated iron powder concentration was obtained. The point of time at which the actually measured iron powder concentration was obtained may be the point of time at which the worker sampled the grease or may be the point of time at which the concentration data obtaining part 202 obtained the actually measured iron powder concentration. The point of time at which the estimated iron powder concentration was obtained may be the point of time at which the deriving of the estimated iron powder concentration was completed or may be predetermined time earlier than the point of time at which the deriving of the estimated iron powder concentration was completed.

The data transmission part 204 transmits, to the machine learning apparatus 300, the concentration data combined with the speed data and the torque data corresponding to a predetermined period of time associated with the point of time at which the concentration data was obtained (this combination will be hereinafter referred to as "learning data set"). It is to be noted that there is a predetermined relationship between the point of time at which the concentration data was obtained and the above-described predetermined period of time. That is, the relationship is such that the speed data and the torque data corresponding to the predetermined period of time are somewhat correlated with the concentration data. For example, the above-described predetermined period of time may be a period of time immediately before the point of time at which the concentration data was obtained, or may be a period of time including the point of time at which the concentration data was obtained.

The model storage 206 stores the concentration estimation model, which indicates the above-described relationship between the speed data, the torque data, and the concentration data. The concentration estimation model is a program module that outputs an estimated iron powder concentration that is based on the speed data and the torque data that have been input. A non-limiting example of the concentration estimation model is a neural net connecting an input vector including the speed data and the torque data to an output vector including the concentration data.

The model receiving part 205 receives a data of the concentration estimation model from the machine learning apparatus 300. The data of the concentration estimation model may be the concentration estimation model itself or may be a parameter for identifying the concentration estimation model (an example of the parameter is a weighting parameter of a node(s) of the neural net). The model receiving part 205 uses the data obtained from the machine learning apparatus 300 to update the concentration estimation model stored in the model storage 206. For example, the model receiving part 205 overwrites the concentration estimation model with the parameter obtained from the machine learning apparatus 300 and saves the parameter in the model storage 206.

The concentration estimation part 207 obtains, from the data storage 203, the speed data and the torque data corresponding to the predetermined period of time (the speed data and the torque data will be hereinafter referred to as "input data set"). Then, the concentration estimation part 207 inputs the input data set into the concentration estimation model stored in the model storage 206 to derive the estimated iron powder concentration.

The model building part 208 builds an increasing estimation model based on a time transition of the estimated iron powder concentration. The increasing estimation model includes a future time transition of the estimated iron powder concentration. For example, the model building part 208 determines whether a predetermined number of new estimated iron powder concentrations have accumulated in the data storage 203 (the new estimated iron powder concentrations are those not used by the model building part 208 to build the increasing estimation model). Upon determining that a predetermined number of new estimated iron powder concentrations have accumulated in the data storage 203, the model building part 208 builds the increasing estimation model of the concentration data based on the predetermined number of estimated iron powder concentrations. A non-limiting example of the increasing estimation model is a function that indicates a relationship between the total drive time of the reducer and the estimated iron powder concentration. For example, the model building part 208 builds the increasing estimation model by polynomial interpolation of the predetermined number of estimated iron powder concentrations.

The maintenance assistance part 209 derives a recommended point of time for maintenance of the reducer 18 based on the increasing estimation model obtained from the model building part 208. The recommended point of time for maintenance of the reducer 18 refers to, for example, a point of time at which the iron powder concentration in the grease in the reducer 18 reaches a predetermined threshold. The threshold is preset based on a past record. For example, based on the increasing estimation model, the maintenance assistance part 209 calculates the total drive time of the reducer 18 at the time when the estimated iron powder concentration reaches the predetermined threshold. This total drive time is regarded as the recommended point of time for maintenance of the reducer 18 (this recommended point of time will be hereinafter referred to as "first recommended point of time"). It is to be noted that the maintenance assistance part 209 may calculate, as the first recommended point of time, the total drive time of the reducer 18 at the time when the speed at which the iron powder concentration in the grease in the reducer 18 increases reaches a predetermined threshold. The maintenance assistance part 209 generates an image data for displaying the derived first recommended point of time, and outputs the image data to the monitor 21.

The estimation equation modification part 210 modifies the estimation equation so that the recommended point of time for maintenance of the reducer 18 derived based on the estimation equation (this recommended point of time will be hereinafter referred to as "second recommended point of time") is as close as possible to the first recommended point of time derived by the maintenance assistance part 209. The estimation equation is a mathematical formula that indicates a recommended point of time for maintenance of the reducer 18 in relation to the rotational speed of the reducer 18 and the torque acting on the reducer 18. A non-limiting example of the estimation equation is a lifetime estimation equation indicating the lifetime of the bearing of the reducer. The second recommended point of time can be derived based on the estimation equation represented by the following Formula (1). For example, the estimation equation modification part 210 modifies the value of correction coefficient A to make the second recommended point of time as close as possible to the first recommended point of time. It is to be noted that the estimation equation modification part 210 may modify an approximation function preset to indicate a relationship between the second recommended point of time and the first recommended point of time (an example of the approximation function is a coefficient).

[Mathematical Formula 1]

$$L = A \times K \times \frac{N_0}{N_n} \times \left(\frac{T_0}{T_n}\right)^P \tag{1}$$

L: Second recommended point of time (h)
K: Rated lifetime of the bearing of the reducer 18 (h)
$N_0$: Rated speed of the reducer 18 (rpm)
$N_n$: Rotational speed of the reducer 18 per hour (rpm/h)
$T_0$: Rated torque of the reducer 18 (Nm)
$T_n$: Torque of the reducer 18 per hour (Nm/h)
P: Constant determined based on the kind of the reducer 18

The maintenance assistance part 211 derives the second recommended point of time based on setting values set as the rotational speed of the reducer 18 and the torque acting on the reducer 18 and based on the estimation equation modified by the estimation equation modification part 210. For example, the maintenance assistance part 211 obtains the setting values from the input device 22. The maintenance assistance part 211 generates an image data for displaying the second recommended point of time, and outputs the image data to the monitor 21. The maintenance assistance part 211 may generate an image data for displaying the first recommended point of time and the second recommended point of time at the same time. Also, the maintenance assistance part 211 may generate an image data for displaying the difference between the first recommended point of time and the second recommended point of time together with at least one of the first recommended point of time and the second recommended point of time.

Machine Learning Apparatus

The machine learning apparatus 300 executes: storing the speed data (associated with the rotational speed of the reducer 18 of each of the actuators 11 to 16), the torque data (associated with the torque acting on the reducer 18), and the concentration data (indicating the iron powder concentration in the grease in the reducer 18) such that the speed data, the torque data, and the concentration data are correlated with each other; and performing machine learning based on the stored information to build the concentration estimation model, which indicates a relationship between the speed data, the torque data, and the concentration data.

The machine learning apparatus 300 may further execute receiving, from the maintenance assistance apparatus 200: the speed data and the torque data; and the concentration estimation data derived by inputting the speed data and the torque data into the concentration estimation model.

The machine learning apparatus 300 includes functional configurations (hereinafter referred to as "functional modules"), namely, a data receiving part 301, a database 302, a model building part 303 (first model building part), a model evaluation part 304, and a model storage 305.

In the database 302, the speed data associated with the rotational speed of the reducer 18, the torque data associated with the torque acting on the reducer 18, and the concentration data indicating the iron powder concentration in the grease in the reducer 18 are stored and correlated with each other. For example, a learning data set accumulates in the database 302. The learning data set is a combination of the concentration data and the speed data and the torque data corresponding to a predetermined period of time associated with the point of time at which the concentration data was obtained.

The data receiving part 301 receives a learning data set from the data transmission part 204 of the maintenance assistance apparatus 200 and stores the learning data set in the database 302.

The model building part 303 performs machine learning based on the information stored in the database 302 to build the concentration estimation model, which indicates a relationship between the speed data, the torque data, and the concentration data. For example, the model building part 303 uses a training data that combines the speed data and the torque data corresponding to a predetermined period of time included in the learning data set with the actually measured iron powder concentration included in the learning data set. Using the training data, the model building part 303 tunes a parameter (for example, a weighting parameter of a node(s) of the neural net) of the concentration estimation model by performing, for example, machine learning processing such as deep learning.

The model storage 305 stores the concentration estimation model built by the model building part 303. The model evaluation part 304 evaluates the concentration estimation model built by the model building part 303 (hereinafter referred to as "new model"), and updates the concentration estimation model stored in the model storage 305 based on the result of the evaluation. Specifically, the model evaluation part 304 reads the speed data and the torque data from the learning data set that is stored in the database 302 and that includes the estimated iron powder concentration (hereinafter referred to as "previous estimation result"). Then, the model evaluation part 304 inputs the speed data and the torque data into the new model to calculate a new estimated iron powder concentration (hereinafter referred to as "new estimation result"). Then, the model evaluation part 304 determines whether the new estimation result or the previous estimation result is closer to the actually measured iron powder concentration (actually measured iron powder concentration included in the learning data set). When the new estimation result is closer to the actually measured iron powder concentration than the previous estimation result is to the actually measured iron powder concentration, the model evaluation part 304 overwrites the data of the model storage 305 with the data of the new model and saves the data of the new model.

Figure 4:
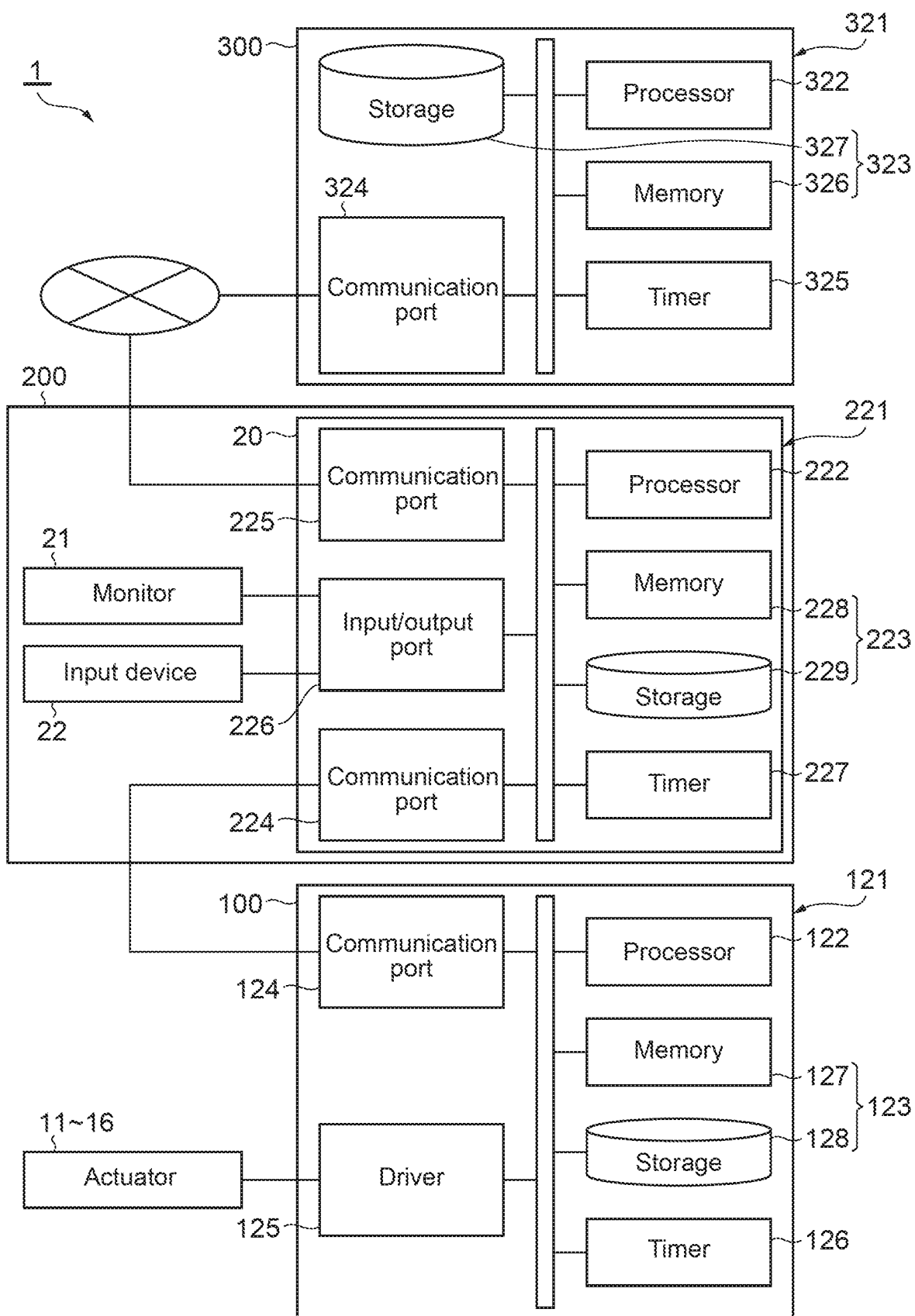
FIG. 4 is a block diagram illustrating a hardware configuration of a control system.

FIG. 4 is a block diagram illustrating a hardware configuration of the control system 1. As illustrated in FIG. 4, the robot controller 100 includes a circuit 121. The circuit 121 includes one processor or a plurality of processors 122, a memory unit 123, a communication port 124, a driver 125, and a timer 126.

The memory unit 123 includes a memory 127 and a storage 128. The storage 128 is computer-readable and records programs for implementing the functional modules of the robot controller 100. Examples of the storage 128 include, but are not limited to, a hard disc, a nonvolatile semiconductor memory, a magnetic disc, and an optical disc. The memory 127 temporarily records: programs loaded from the storage 128; and results of operations performed by the processor 122. The processor 122 cooperates with the memory 127 to execute the above-described programs, thereby implementing the functional modules of the robot controller 100. The processor 122 cooperates with the memory 127 to execute the above-described programs, thereby implementing the functional modules of the robot controller 100, examples of the functional modules including, but not limited to, the position control part 101, the speed control part 102, and the torque control part 103

The communication port 124, at a command from the processor 122, makes information communication (for example, high speed serial communication) with a communication port 224 (described later) of the maintenance assistance apparatus 200. The driver 125 controls the actuators 11 to 16 at a command from the processor 122. The timer 126 measures a lapse of time by, for example, counting reference pulses having a predetermined fixed period.

The body 20 of the maintenance assistance apparatus 200 includes a circuit 221. The circuit 221 includes one processor or a plurality of processors 222, a memory unit 223, communication ports 224 and 225, an input/output port 226, and a timer 227.

The memory unit 223 includes a memory 228 and a storage 229. The storage 229 functions as the data storage 203 and the model storage 206, and records programs for implementing the functional modules of the maintenance assistance apparatus 200. Examples of the storage 229 include, but are not limited to, a hard disc, a nonvolatile semiconductor memory, a magnetic disc, and an optical disc. The memory 228 temporarily records: programs loaded from the storage 229; and results of operations performed by the processor 222. The processor 222 cooperates with the memory 228 to execute the above-described programs, thereby implementing the functional modules of the maintenance assistance apparatus 200. The processor 222 cooperates with the memory 228 to execute the above-described programs, thereby implementing the functional modules of the maintenance assistance apparatus 200, examples of the functional modules including, but not limited to, the speed-torque data obtaining part 201, the concentration data obtaining part 202, the data transmission part 204, the model receiving part 205, the concentration estimation part 207, the model building part 208, the maintenance assistance part 209, the estimation equation modification part 210, and the maintenance assistance part 211.

The communication port 224, at a command from the processor 222, makes information communication (for example, high speed serial communication) with the communication port 124 of the robot controller 100. The communication port 225, at a command from the processor 222, makes information communication (for example, high speed serial communication) with a communication port 324 (described later) of the machine learning apparatus 300. The input/output port 226 inputs and outputs electric signals from and to devices such as the monitor 21 and the input device 22. The timer 227 measures a lapse of time by, for example, counting reference pulses having a predetermined fixed period.

The machine learning apparatus 300 includes a circuit 321. The circuit 321 includes one processor or a plurality of processors 322, a memory unit 323, the communication port 324, and a timer 325.

The memory unit 323 includes a memory 326 and a storage 327. The storage 327 functions as the database 302 and the model storage 305, and records programs for implementing the functional modules of the machine learning apparatus 300. Examples of the storage 327 include, but are not limited to, a hard disc, a nonvolatile semiconductor memory, a magnetic disc, and an optical disc. The memory 326 temporarily records: programs loaded from the storage 327; and results of operations performed by the processor 322. The processor 322 cooperates with the memory 326 to execute the above-described programs, thereby implementing the functional modules of the machine learning apparatus 300. The processor 322 cooperates with the memory 326 to execute the above-described programs, thereby implementing the functional modules of the machine learning apparatus 300, examples of the functional modules including, but not limited to, the data receiver 301, the database 302, the model builder 303, and the model evaluator 304.

The communication port 324, at a command from the processor 322, makes information communication (for example, high speed serial communication) with the communication port 225 of the maintenance assistance apparatus 200. The timer 325 measures a lapse of time by, for example, counting reference pulses having a predetermined fixed period.

It is to be noted that the hardware configurations of the robot controller 100, the maintenance assistance apparatus 200, and the machine learning apparatus 300 will not be limited to the above-described functional modules implemented by programs. For example, the functional modules of the robot controller 100, the maintenance assistance apparatus 200, and the machine learning apparatus 300 may be implemented by dedicated logic circuits or an application specific integrated circuit (ASIC) in which these logic circuits are integrated.

Data Generating Method for Generating Data of Concentration Estimation Model

Next, an example of the data generating method for generating data of the concentration estimation model will be described. Specifically, description will be made with regard to processings performed by the machine learning apparatus 300 and the maintenance assistance apparatus 200 of the control system 1. The processings include: machine learning processing performed by the machine learning apparatus 300; and model updating processing performed by the maintenance assistance apparatus 200. A procedure for each processing will be described below.

Procedure for Machine Learning Processing

Figure 5:
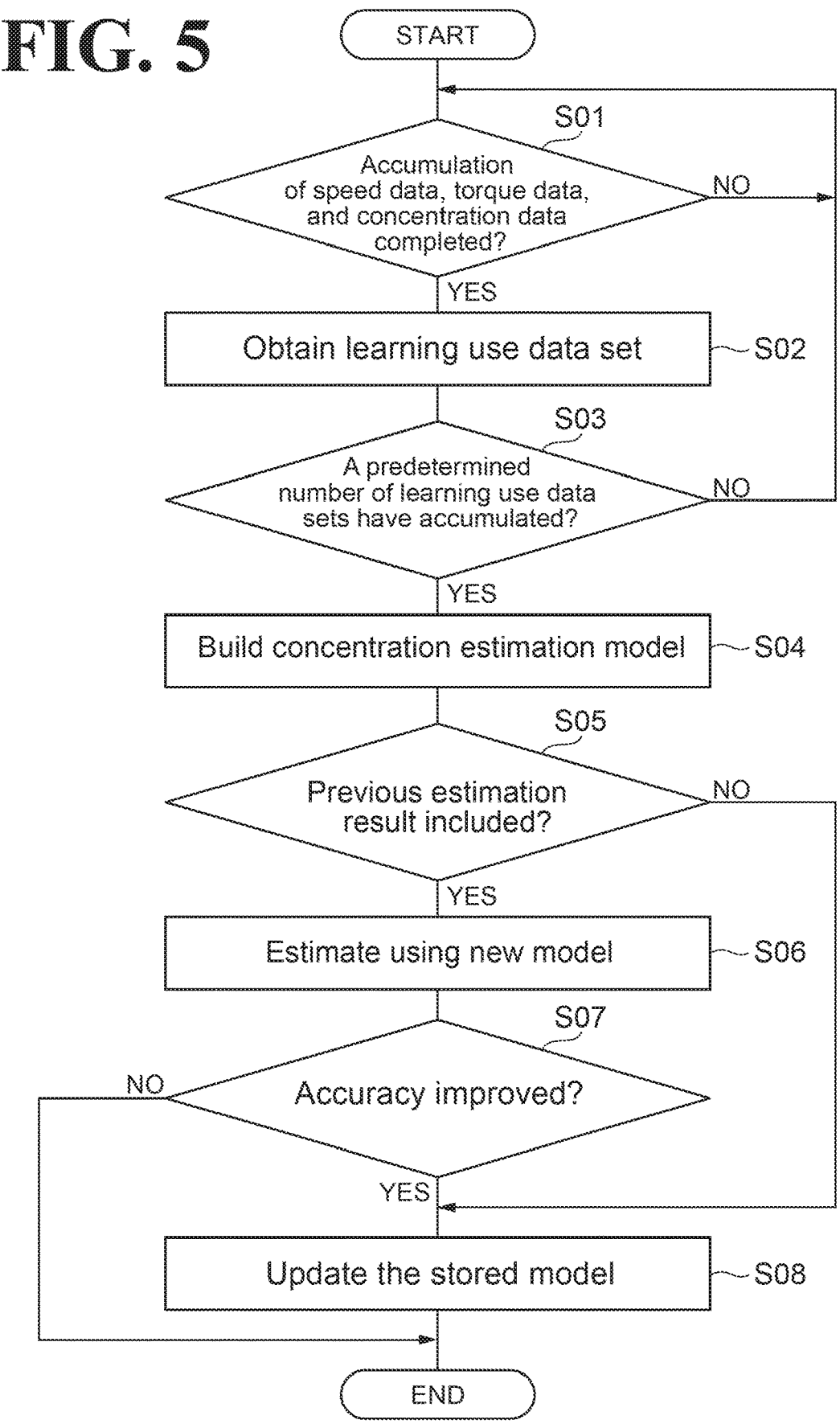
FIG. 5 is a flowchart of a procedure for the machine learning processing.

FIG. 5 is a flowchart of a procedure for the machine learning processing. As illustrated in FIG. 5, the machine learning apparatus 300 performs step S01 first. At step S01, the data receiving part 301 waits for one learning data set to accumulate in the data storage 203 of the maintenance assistance apparatus 200. The learning data set includes: the speed data and the torque data corresponding to a predetermined period of time; and the actually measured iron powder concentration at the point of time corresponding to the predetermined period of time.

Next, the machine learning apparatus 300 performs step S02. At step S02, the data receiving part 301 obtains the learning data set from the data transmission part 204 of the maintenance assistance apparatus 200, and stores the learning data set in the database 302.

Next, the machine learning apparatus 300 performs step S03. At step S03, the model building part 303 determines whether a predetermined number of new learning data sets (learning data sets not used in machine learning) have accumulated in the database 302. Upon determining that the number of new learning data sets that have accumulated in the database 302 is short of the predetermined number, the machine learning apparatus 300 returns the processing to step SOI. The machine learning apparatus 300 repeats obtaining and storing a learning data set until the machine learning apparatus 300 determines that a predetermined number of new learning data sets have accumulated in the database 302.

Upon determining at step S03 that a predetermined number of new learning data sets have accumulated in the database 302, the machine learning apparatus 300 performs step S04. At step S04, the model building part 303 performs machine learning based on the information stored in the database 302 to build a concentration estimation model.

Next, the machine learning apparatus 300 performs step S05. At step S05, the model evaluation part 304 checks whether any one of the new learning data sets includes the above-described previous estimation result derived using the previous model (for example, the concentration estimation model currently stored in 206).

Upon determining at step S05 that any one of the new learning data sets includes the previous estimation result, the machine learning apparatus 300 performs step S06. At step S06, the model evaluation part 304 inputs, into the new model, the speed data and the torque data corresponding to the concentration estimation data (the new model is the concentration estimation model built anew by the model building part 303 at step S05), thereby calculating a new estimation result.

Next, the machine learning apparatus 300 performs step S07. At step S07, the model evaluation part 304 checks whether the concentration estimation data of the new model has an improved estimation accuracy over the previous model. Specifically, the model evaluation part 304 checks whether the new estimation result is closer to the actually measured iron powder concentration than the previous estimation result is to the actually measured iron powder concentration.

Upon determining at step S07 that the new estimation result is closer to the actually measured iron powder concentration than the previous estimation result is to the actually measured iron powder concentration, the machine learning apparatus 300 performs step S08. Upon determining at step S05 that none of the new learning data sets includes the estimated iron powder concentration, the machine learning apparatus 300 performs step S08, bypassing steps S06 and S07. At step S08, the model evaluation part 304 overwrites the data of the model storage 305 with the data of the new model and saves the data of the new model. Thus, the machine learning processing is completed. Upon determining at step S07 that the previous estimation result is closer to the actually measured iron powder concentration than the new estimation result is to the actually measured iron powder concentration, the machine learning apparatus 300 ends the machine learning processing without performing step S08. The machine learning apparatus 300 repeats the above-described machine learning processing.

Procedure for Model Updating Processing

Figure 6:
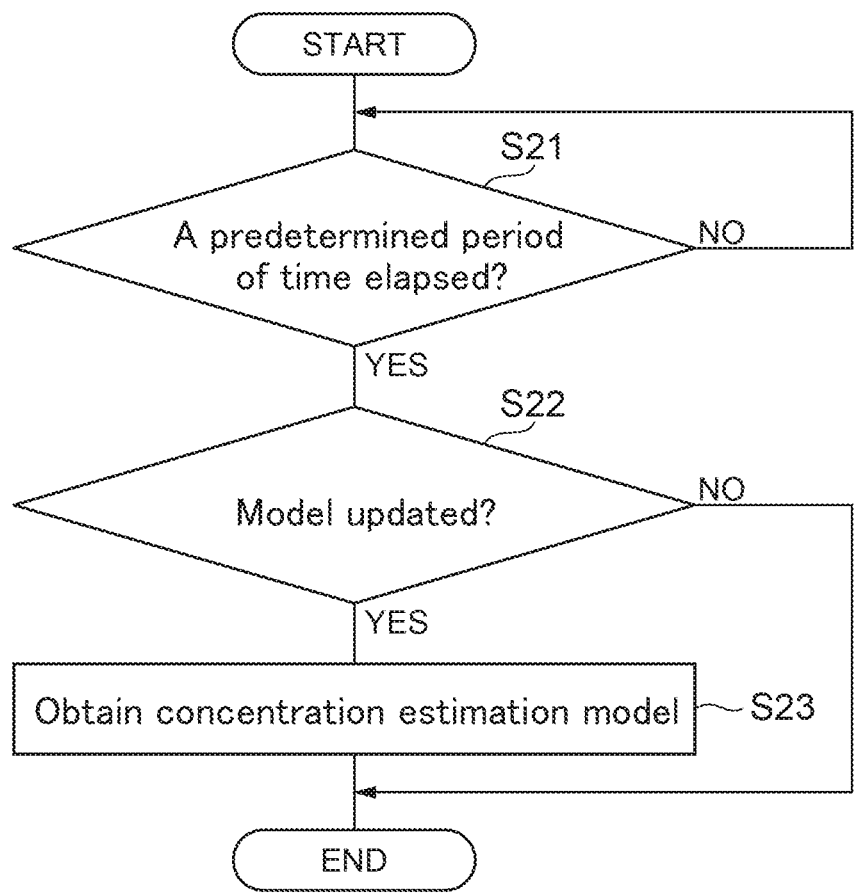
FIG. 6 is a flowchart of a procedure for model updating processing.

FIG. 6 is a flowchart of a procedure for the model updating processing. As illustrated in FIG. 6, the maintenance assistance apparatus 200 performs step S21 first. At step S21, the model receiving part 205 waits for a predetermined period of time to elapse. The predetermined period of time is set as desired by a user according to the model update interval.

After the predetermined period of time has passed, the machine learning apparatus 300 performs step S22. At step S22, the model receiving part 205 checks whether the concentration estimation model has been updated. Specifically, through a model transmission part 306 of the machine learning apparatus 300, the model receiving part 205 checks whether the concentration estimation model stored in the model storage 305 has been updated.

Upon determining at step S22 that the concentration estimation model has been updated, the maintenance assistance apparatus 200 performs step S23. At step S23, the model receiving part 205 receives the concentration estimation model from the model transmission part 306 of the machine learning apparatus 300. Then, the model receiving part 205 overwrites the data of the model storage 206 with the received concentration estimation model and saves the concentration estimation model. Thus, the model updating processing is completed. Upon determining at step S22 that the concentration estimation model has not been updated, the maintenance assistance apparatus 200 ends the model updating processing without performing step S23. The maintenance assistance apparatus 200 repeats the above-described model updating processing.

Maintenance Assisting Method for Assisting Maintenance of Reducer

Next, an example of the maintenance assisting method for assisting maintenance of the reducer will be described. Specifically, description will be made with regard to processings performed by the maintenance assistance apparatus 200 of the control system 1. The processings include: deriving processing of deriving, using an increasing estimation model, a recommended point of time for maintenance; and deriving processing of deriving, using an estimation equation, a recommended point of time for maintenance. A procedure for each processing will be described below.

Figure 7:
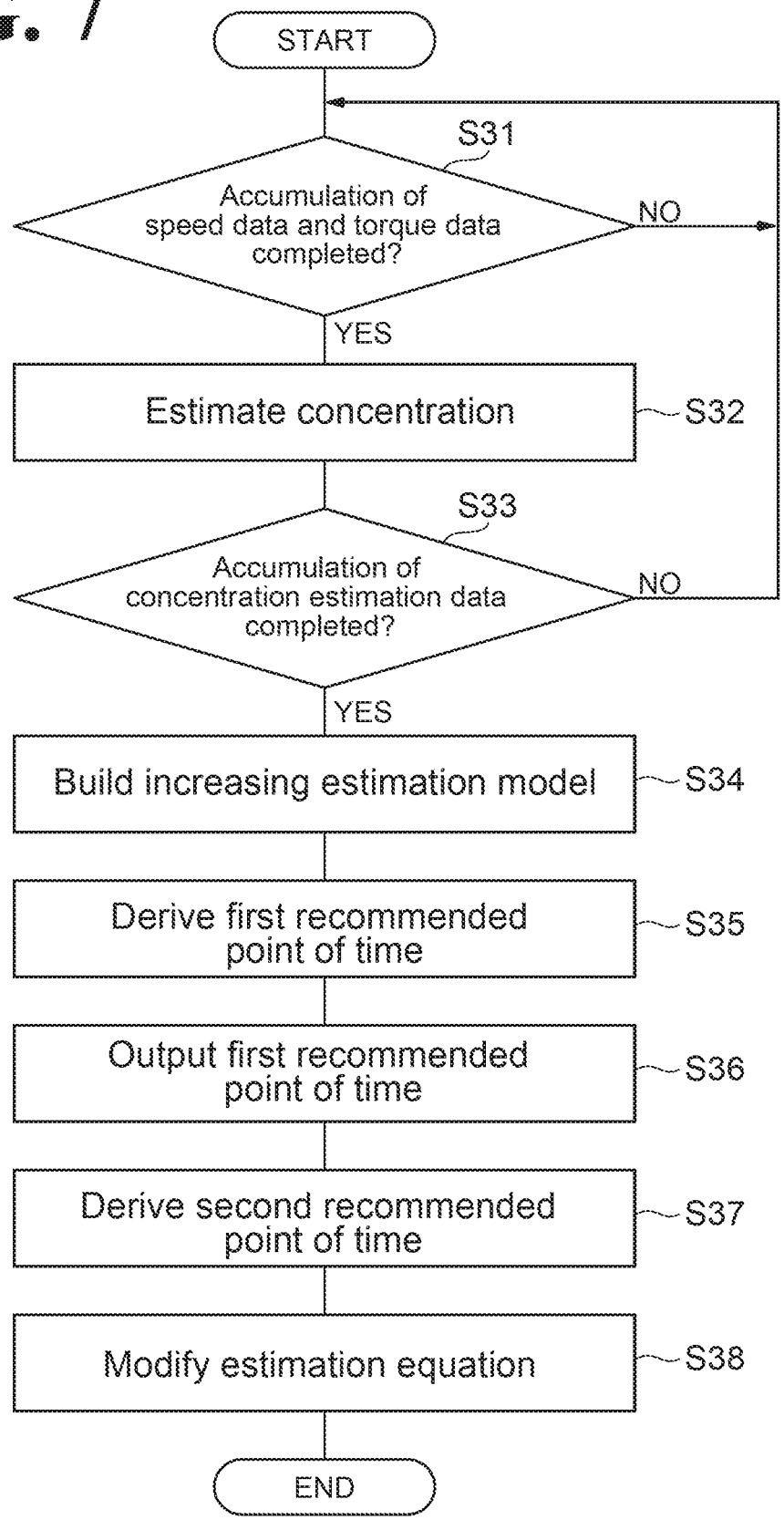
FIG. 7 is a flowchart of a procedure for deriving processing of deriving a recommended point of time for maintenance.

Procedure for Deriving Processing of Deriving, Using Increasing Estimation Model, Recommended Point of Time for Maintenance FIG. 7 is a flowchart of a procedure for deriving processing of deriving, using an increasing estimation model, a recommended point of time for maintenance. As illustrated in FIG. 7, the maintenance assistance apparatus 200 performs step S31 first. At step S31, the concentration estimation part 207 waits for a new input data set (input data set not used in concentration estimation) to accumulate in the data storage 203. The new input data set includes the speed data and the torque data corresponding to the predetermined period of time.

Next, the maintenance assistance apparatus 200 performs step S32. At step S32, the concentration estimation part 207 inputs the new input data set into the concentration estimation model stored in the model storage 206, thereby deriving an estimated iron powder concentration. Then, the concentration data obtaining part 202 stores the estimated iron powder concentration in the data storage 203.

Next, the maintenance assistance apparatus 200 performs step S33. At step S33, the model building part 208 determines whether a predetermined number of new estimated iron powder concentrations (estimated iron powder concentrations that have not been input into the increasing estimation model yet) have accumulated in the data storage 203. Upon determining that the number of new estimated iron powder concentrations that have accumulated is short of the predetermined number, the maintenance assistance apparatus 200 returns the processing to step S31. The maintenance assistance apparatus 200 repeats deriving and storing an estimated iron powder concentration until the maintenance assistance apparatus 200 determines that a predetermined number of new estimated iron powder concentrations have accumulated in the data storage 203.

At step S33, upon determining that a predetermined number of new estimated iron powder concentrations have accumulated in the data storage 203, the maintenance assistance apparatus 200 performs step S34. At step S34, the model building part 208 builds an increasing estimation model of the concentration data based on the predetermined number new estimate iron powder concentrations.

Next, the maintenance assistance apparatus 200 performs step S35. At step S35, based on the increasing estimation model, the maintenance assistance part 209 derives the above-described first recommended point of time (the recommended point of time for maintenance of the reducer 18 derived using the increasing estimation model).

Next, the maintenance assistance apparatus 200 performs step S36. At step S36, the maintenance assistance part 209 generates an image data of the first recommended point of time, and outputs the image data to the monitor 21.

Next, the maintenance assistance apparatus 200 performs steps S37 and S38 in this order. At step S37, based on the estimation equation represented by above Formula (1), the maintenance assistance part 211 derives the above-described second recommended point of time (the recommended point of time for maintenance of the reducer 18 derived using an estimation equation). At step S38, the estimation equation modification part 210 modifies the estimation equation to make the second recommended point of time as close as possible to the first recommended point of time. For example, the estimation equation modification part 210 modifies the value of the correction coefficient A by multiplying the value of the correction coefficient A by the ratio between the second recommended point of time calculated at step S37 and the first recommended point of time calculated at step S35. Thus, the deriving processing of deriving, using an increasing estimation model, a recommended point of time for maintenance is completed. The maintenance assistance apparatus 200 repeats the deriving processing of deriving a recommended point of time for maintenance.

Figure 8:
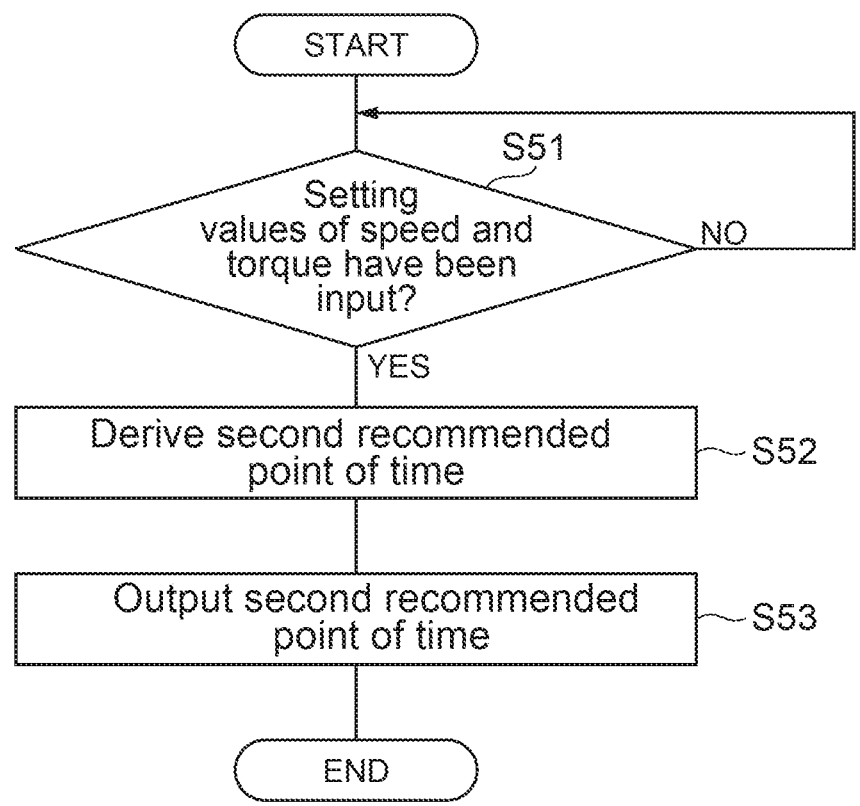
FIG. 8 is a flowchart of another procedure for deriving processing of deriving a recommended point of time for maintenance.

Procedure for Deriving Processing of Deriving, Using Estimation Equation, Recommended Point of Time for Maintenance FIG. 8 is a flowchart of a procedure for deriving processing of deriving, using an estimation equation, a recommended point of time for maintenance. As illustrated in FIG. 8, the maintenance assistance apparatus 200 performs step S51 first. At step S51, the maintenance assistance part 211 waits for setting values of the rotational speed and torque of the reducer 18 to be input into the input device 22.

After the data of the rotational speed data and the data of the torque have been changed, the maintenance assistance apparatus 200 performs step S52. At step S52, the maintenance assistance part 211 derives the second recommended point of time based on the setting values that has been input and based on the estimation equation modified by the estimation equation modification part 210. For example, the maintenance assistance part 211 derives the second recommended point of time based on above Formula (1).

Next, the maintenance assistance apparatus 200 performs step S53. At step S53, the maintenance assistance part 211 generates an image data for displaying the second recommended point of time, and outputs the image data to the monitor 21. Thus, the deriving processing of deriving, using an estimation equation, a recommended point of time for maintenance is completed. The maintenance assistance apparatus 200 repeats the deriving processing of deriving a recommended point of time for maintenance.

Advantageous Effects of this Embodiment

The control system 1 for an actuator includes the database 302 and the model building part 303. In the database 302, speed data, torque data, and concentration data are stored and correlated with each other. The speed data is associated with the rotational speed of the reducer 18 of each of the actuators 11 to 16. The torque data is associated with the torque acting on the reducer 18. The concentration data indicates the iron powder concentration in the grease in the reducer 18. The model building part 303 performs machine learning based on the speed data, the torque data, and the concentration data stored in the database 302 to build a concentration estimation model indicating a relationship between the speed data, the torque data, and the concentration data.

Thus, the control system 1 uses a concentration estimation model that is built by machine learning. This configuration ensures that the concentration data is estimated with improved accuracy based on the speed data and the torque data. The above configuration also ensures that the concentration data (concentration estimation data) accumulates over time without being actually measured. The concentration estimation data that has accumulated over time contributes to deriving an appropriate recommended point of time for maintenance of the reducer 18.

The control system 1 for an actuator may further include the concentration estimation part 207, the model building part 208, and the maintenance assistance part 209. The concentration estimation part 207 inputs the speed data and the torque data into the concentration estimation model to derive concentration estimation data. The model building part 208 builds an increasing estimation model of the concentration data based on a time transition of the concentration estimation data. The maintenance assistance part 209 derives a first recommended point of time for maintenance of the reducer 18 (first recommended point of time) based on the increasing estimation model. This configuration ensures that a concentration estimation data with improved accuracy is used to build an increasing estimation model of the concentration data with improved accuracy. By using this increasing estimation model of the concentration data, a more appropriate recommended point of time for maintenance of the reducer 18 is derived.

The control system 1 for an actuator may further include the estimation equation modification part 210 and the maintenance assistance part 211. The estimation equation modification part 210 modifies an estimation equation for deriving a second recommended point of time for the maintenance of the reducer 18 so as to make the second recommended point of time as close as possible to the first recommended point of time. The estimation equation indicates a relationship between the second recommended point of time, the rotational speed of the reducer 18, and the torque acting on the reducer 18 (for example, the estimation equation indicates the second recommended point of time in relation to the rotational speed of the reducer 18 and the torque acting on the reducer 18). The maintenance assistance part 211 derives the second recommended point of time for maintenance of the reducer 18 based on the rotational speed of the reducer 18, the torque acting on the reducer 18, and the estimation equation modified by the estimation equation modification part 210. This configuration ensures that the estimation equation is modified to more appropriately indicate the relationship that the rotational speed of the reducer 18 and the torque acting on the reducer 18 have with a recommended point of time for maintenance of the reducer 18. This eliminates the need for waiting for estimation values of the iron powder concentration to accumulate in changing motion conditions including rotational speed and torque; instead, the modified estimation equation may be used to derive an appropriate recommended point of time for maintenance.

The machine learning apparatus 300 may further include the data receiving part 301. The data receiving part 301 receives, from the maintenance assistance apparatus 200: the speed data, the torque data, and the concentration estimation data derived by inputting the speed data and the torque data into the concentration estimation model. The database 302 may further store the speed data, the torque data, and the concentration estimation data that have been received by the data receiving part 301 such that the speed data, the torque data, and the concentration estimation data are correlated with each other. The maintenance assistance apparatus 200 may further include the data transmission part 204. The data transmission part 204 transmits the speed data, the torque data, and a concentration estimation data to the machine learning apparatus 300 such that the speed data, the torque data, and the concentration estimation data are correlated with each other. The concentration estimation data is derived by the concentration estimation part 207 inputting the speed data and the torque data into the concentration estimation model. This configuration ensures that the history of the concentration estimation model used in the maintenance assistance apparatus 200 can be used to improve the quality of the concentration estimation model.

The maintenance assistance apparatus 200 may further include the model receiving part 205. The model receiving part 205 receives, from the machine learning apparatus 300, a data of the concentration estimation model built by the model building part 303. This configuration ensures that the result of machine learning performed in the machine learning apparatus 300 is applied to the maintenance assistance apparatus 200, and this reduces the processing load on the maintenance assistance apparatus 200.

While in the above-described embodiment a single circuit is used to perform the functional modules of the robot controller 100, this configuration is not intended in a limiting sense; it is also possible to use a plurality of circuits to perform the respective functional modules of the robot controller 100. While in the above-described embodiment a single circuit is used to perform the functional modules of the maintenance assistance apparatus 200, this configuration is not intended in a limiting sense; it is also possible to use a plurality of circuits to perform the respective functional modules of the maintenance assistance apparatus 200. While in the above-described embodiment a single circuit is used to perform the functional modules of the machine learning apparatus 300, this configuration is not intended in a limiting sense; it is also possible to use a plurality of circuits to perform the respective functional modules of the machine learning apparatus 300.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A control system for an actuator, comprising:
a non-transitory computer readable medium storing a database in which first information, second information and third information are stored and correlated with each other; and
processing circuitry configured to perform machine learning based on the first information, the second information and the third information stored in the database,
wherein the first information is associated with a rotational speed of a reducer in the actuator, the second information is associated with a torque acting on the reducer, the third information indicates a concentration of iron powder in grease in the reducer, and the machine learning builds a concentration estimation model indicating a relationship between the first information, the second information and the third information, and wherein the processing circuitry is configured to
build an increasing estimation model of the third information based on a time transition of an estimation value of the third information,
derive a first recommended point of time for maintenance of the reducer based on the increasing estimation model, and
modify an estimation equation for deriving a second recommended point of time for the maintenance of the reducer to make the second recommended point of time within a timeframe of the first recommended point of time derived by the processing circuitry.

2. The control system according to claim 1, wherein the processing circuitry is configured to input the first information and the second information into the concentration estimation model to derive the estimation value of the third information.

3. The control system according to claim 2, wherein the estimation equation indicates a relationship between the second recommended point of time, the rotational speed of the reducer, and the torque acting on the reducer, and the processing circuitry is configured to derive the second recommended point of time based on the rotational speed of the reducer, the torque acting on the reducer, and the estimation equation modified by the processing circuitry.

4. The control system according to claim 3, wherein the estimation equation comprises a lifetime estimation equation indicating a lifetime of a bearing of the reducer.

5. A machine learning apparatus, comprising:
a non-transitory computer readable medium storing a database in which first information, second information and third information are stored and correlated with each other; and
machine learning processing circuitry configured to perform machine learning based on the first information, the second information and the third information stored in the database,
wherein the first information is associated with a rotational speed of a reducer in an actuator, the second information is associated with a torque acting on the reducer, the third information indicates a concentration of iron powder in grease in the reducer, and the machine learning builds a concentration estimation model indicating a relationship between the first information, the second information and the third information, and
wherein the machine learning processing circuitry is configured to communicate with a maintenance assistance apparatus, the maintenance assistance apparatus includes maintenance assistance processing circuitry configured to
build an increasing estimation model of the third information based on a time transition of an estimation value of the third information,
derive a first recommended point of time for maintenance of the reducer based on the increasing estimation model, and
modify an estimation equation for deriving a second recommended point of time for the maintenance of the reducer to make the second recommended point of time within a timeframe of the first recommended point of time derived by the maintenance assistance processing circuitry.

6. The machine learning apparatus according to claim 5, wherein the machine learning processing circuitry is configured to receive the first information, the second information and the estimation value of the third information from the maintenance assistance apparatus that includes the maintenance assistance processing circuitry, which is configured to input the first information and the second information into the concentration estimation model to derive the estimation value of the third information, and the first information received by the machine learning processing circuitry, the second information received by the machine learning processing circuitry, and the estimation value of the third information received by the machine learning processing circuitry are stored and correlated with each other in the database.

7. A maintenance assistance apparatus, comprising:
maintenance assistance processing circuitry configured to input first information and second information into a concentration estimation model to derive an estimation value of third information, build an increasing estimation model of the third information based on a time transition of the estimation value of the third information, and derive a first recommended point of time for maintenance of a reducer based on the increasing estimation model,
wherein the first information is associated with a rotational speed of the reducer in an actuator, the second information is associated with a torque acting on the reducer, the third information indicates a concentration of iron powder in grease in the reducer, and the concentration estimation model indicates a relationship between the first information, the second information and the third information, and
wherein the maintenance assistance processing circuitry is configured to modify an estimation equation for deriving a second recommended point of time for the maintenance of the reducer to make the second recommended point of time within a timeframe of the first recommended point of time derived by the maintenance assistance processing circuitry.

8. The maintenance assistance apparatus according to claim 7, wherein the maintenance assistance processing circuitry is configured derive the second recommended point of time based on the rotational speed of the reducer, the torque acting on the reducer, and the estimation equation modified by the maintenance assistance processing circuitry, and the estimation equation indicates a relationship between the second recommended point of time, the rotational speed of the reducer and the torque acting on the reducer.

9. The maintenance assistance apparatus according to claim 8, wherein the estimation equation includes a lifetime estimation equation indicating a lifetime of a bearing of the reducer.

10. The maintenance assistance apparatus according to claim 9, wherein the maintenance assistance processing circuitry is configured to receive data of the concentration estimation model from a machine learning apparatus, the machine learning apparatus includes a non-transitory computer readable medium storing a database in which the first information, the second information and the third information are stored and correlated with each other, and machine learning processing circuitry configured to perform machine learning based on the first information, the second information and the third information stored in the database, and the machine learning builds the concentration estimation model.

11. The maintenance assistance apparatus according to claim 10, wherein the maintenance assistance processing circuitry is further configured to transmit, to the machine learning apparatus, the first information, the second information and the estimation value of the third information such that the first information, the second information and the estimation value are correlated with each other.

12. The maintenance assistance apparatus according to claim 8, wherein the maintenance assistance processing circuitry is configured to receive data of the concentration estimation model from a machine learning apparatus, the machine learning apparatus includes a non-transitory computer readable medium storing a database in which the first information, the second information and the third information are stored and correlated with each other, and machine learning processing circuitry configured to perform machine learning based on the first information, the second information and the third information stored in the database, and the machine learning builds the concentration estimation model.

13. The maintenance assistance apparatus according to claim 12, wherein the maintenance assistance processing circuitry is further configured to transmit, to the machine learning apparatus, the first information, the second information and the estimation value of the third information such that the first information, the second information and the estimation value are correlated with each other.

14. The maintenance assistance apparatus according to claim 7, wherein the maintenance assistance processing circuitry is configured to receive data of the concentration estimation model from a machine learning apparatus, the machine learning apparatus includes a non-transitory computer readable medium storing a database in which the first information, the second information and the third information are stored and correlated with each other, and machine learning processing circuitry configured to perform machine learning based on the first information, the second information and the third information stored in the database, and the machine learning builds the concentration estimation model.

15. The maintenance assistance apparatus according to claim 14, wherein the maintenance assistance processing circuitry is further configured to transmit, to the machine learning apparatus, the first information, the second information and the estimation value of the third information such that the first information, the second information and the estimation value are correlated with each other.

16. A method, comprising:
obtaining learning data of first information, second information and third information that are correlated with each other;
performing machine learning based on the learning data, wherein the first information is associated with a rotational speed of a reducer in an actuator, the second information is associated with a torque acting on the reducer, the third information indicates a concentration of iron powder in grease in the reducer, and the machine learning builds a concentration estimation model indicating a relationship between the first information, the second information and the third information;
building an increasing estimation model of the third information based on a time transition of an estimation value of the third information;
deriving a first recommended point of time for maintenance of the reducer based on the increasing estimation model; and
modifying an estimation equation for deriving a second recommended point of time for the maintenance of the reducer to make the second recommended point of time within a timeframe of the first recommended point of time derived by the increasing estimation model.

17. The method according to claim 16, further comprising:
controlling the actuator based on the concentration estimation model.

18. The method according to claim 16, further comprising:
inputting the first information and the second information into the concentration estimation model to derive the estimation value of the third information,
wherein the concentration estimation model indicates the relationship between the first information, the second information and the third information.

19. The method according to claim 18, further comprising:
deriving the second recommended point of time based on the rotational speed of the reducer, the torque acting on the reducer and the modified estimation equation,
wherein the estimation equation indicates a relationship between the second recommended point of time, the rotational speed of the reducer and the torque acting on the reducer.

20. The method according to claim 19, wherein the estimation equation includes a lifetime estimation equation indicating a lifetime of a bearing of the reducer.

* * * * *